(No Model.)
J. KINCAID.
FEED DISTRIBUTER FOR ROLLER MILLS.
No. 314,687. Patented Mar. 31, 1885.
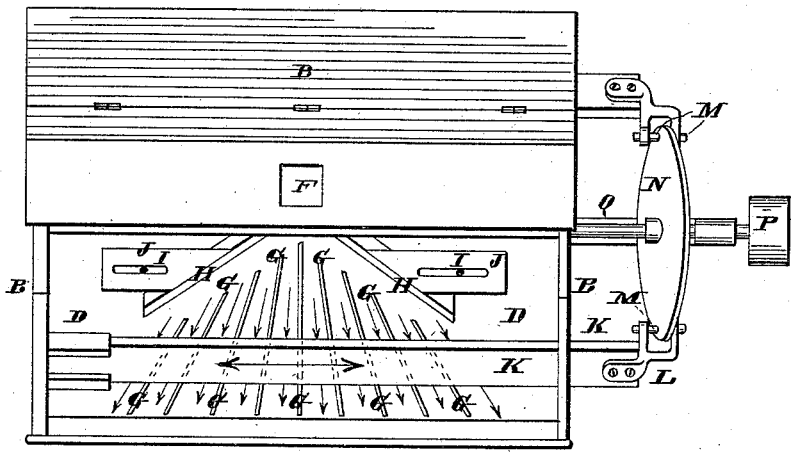
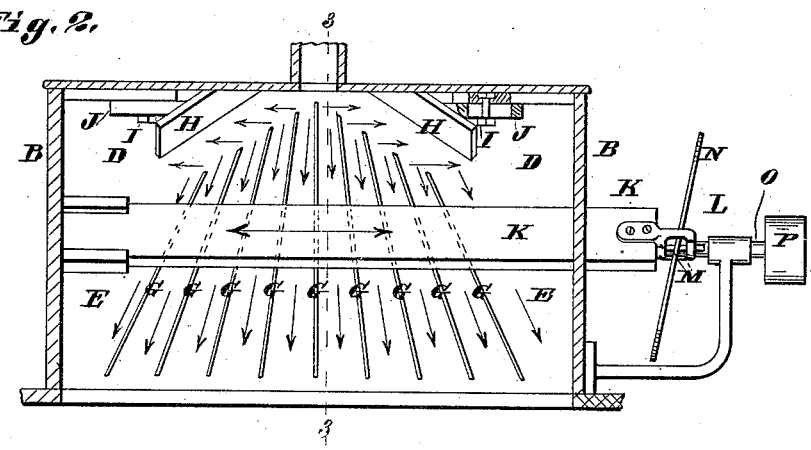
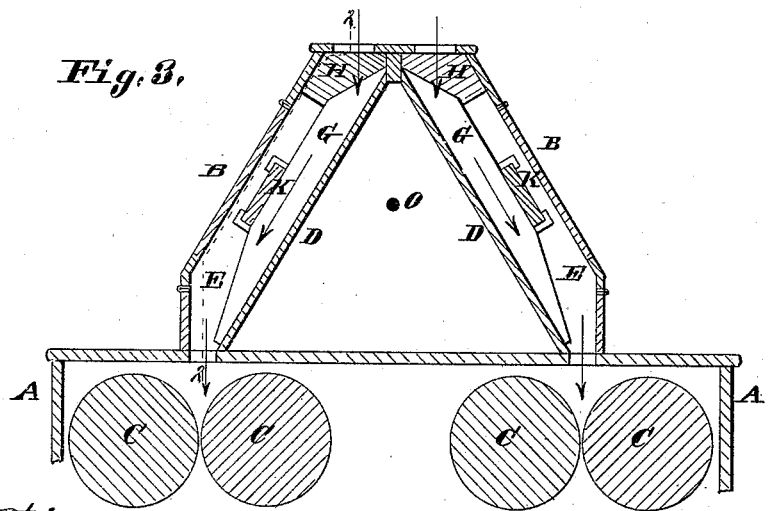
Attest:
Geo. L. Wheelock
Victor A. Lewis
Inventor:
James Kincaid
By Knight Bro.
Attys.

UNITED STATES PATENT OFFICE.

JAMES KINCAID, OF ST. LOUIS, MISSOURI.

FEED-DISTRIBUTER FOR ROLLER-MILLS.

SPECIFICATION forming part of Letters Patent No. 314,687, dated March 31, 1885.

Application filed November 19, 1884. (No model.)

*To all whom it may concern:*

Be it known that I, JAMES KINCAID, of the city of St. Louis, in the State of Missouri, have invented a certain new and useful Improvement in Feed-Distributers for Roller-Mills, of which the following is a full, clear, and exact description, reference being had to the accompanying drawings, forming part of this specification.

This is a device for distributing the material in the hopper and at the same time keeping its lower inclined side clear of deposit when middlings, &c., are being ground.

Figure 1 is a top view of a hopper for a double roller-mill with one-half the cover or hopper-top removed. Fig. 2 is a longitudinal section at 2 2, Fig. 3, being a side view of the feed-distributing apparatus. Fig. 3 is a transverse section at 3 3, Fig. 2.

A is part of the case of the mill, and B is the hopper. No novelty is claimed in these nor in the rollers C nor cant-boards D. The grain or other material enters the hoppers E through the spouts F, and falls upon the inclined lower sides, D, between the inclined reciprocating boards or slats G, which distribute the material toward the ends of the hopper. Preferably the central one of these boards is vertical, while those on either side incline toward it, as shown, so that the material passing down between them shall move toward the ends of the hopper in descending. The impingement of the upper ends of the boards G against the descending material throws it toward the ends of the hopper, in which movement some of it strikes against the inclined deflecting-boards H, and is thrown downward by them. The deflecting-boards are secured to the top of the hopper by screws I, which pass through slots in the brackets J upon the boards. By this means of attachment the deflecting-boards are made adjustable. The distributing boards or slats G have their lower edges in close proximity to the lower inclined side, D, of the hopper, so as to prevent the accumulation of meal or other material thereon. The distributing-boards are attached to bars K, extending from end to end of the hopper and working in guides, so as to be confined to an endwise movement. One end of each bar K extends from the end of the hopper, and carries a yoke, L, having toes or friction-wheels M, which impinge against the opposite faces of a rotary cam, N, whereby the reciprocation of the bars K with their distributing-boards in both hoppers is produced. The cam N consists of a flat disk mounted concentrically, but at an inclination, upon a shaft, O, rotated by a belt on the pulley P.

I do not limit myself to the described means for causing the reciprocation of the distributers K G, as various means might be used to accomplish this end without essential change in the device.

It will be seen that the distributer-boards G attain a greater elevation as they approach the middle of the hopper, so that each board may throw the material with which its upper part comes in contact over the tops of those boards which are nearer to the end of the hopper.

I am aware that the lower inclined sides of feed-hoppers have been provided with stationary deflecting-boards radiating from a point back of where the material falls upon said board, and also that feed-hoppers have been provided, near their delivery-openings, with reciprocating stirrers for preventing the material from packing within the hopper; but such are not the equivalents of my invention.

What I claim as new, and desire to secure by Letters Patent, is—

1. The combination, with a hopper, of a series of upright boards, and means for imparting a lateral reciprocating motion to said boards across the path of the falling material, substantially as and for the purposes set forth.

2. The combination, with a hopper having an inclined lower side, of a series of deflecting-boards placed in close proximity thereto, and means for imparting a lateral reciprocating motion to said boards over the surface of said lower inclined side and across the path of the falling material, as set forth.

3. The combination, with a hopper, of a series of substantially upright slats or boards which project at their upper ends successively higher from the outsides toward the center of the series, and means for imparting a reciprocating motion to said series of boards, as set forth.

4. The combination, with a hopper, a series of upright boards projecting successively higher from the outsides toward the center of said series, and means for imparting a reciprocating motion thereto, of inclined deflecting-boards for directing the grain thrown by the reciprocating boards downward, substantially as set forth.

5. The combination of the hopper B, having the lower inclined side, D, the series of deflecting-boards G, inclining toward the central one of the series, as described, and the reciprocating bar K, to which said boards are secured, as set forth.

JAS. KINCAID.

Witnesses:
SAML. KNIGHT,
GEO. H. KNIGHT.